United States Patent
Li

(10) Patent No.: US 11,217,015 B2
(45) Date of Patent: Jan. 4, 2022

(54) METHOD AND APPARATUS FOR RENDERING GAME IMAGE

(71) Applicant: NETEASE (HANGZHOU) NETWORK CO., LTD., Zhejiang (CN)

(72) Inventor: Bing Li, Zhejiang (CN)

(73) Assignee: NETEASE (HANGZHOU) NETWORK CO., LTD., Hangzhou (CN)

(*) Notice: Subject to any disclaimer, the term of this patent is extended or adjusted under 35 U.S.C. 154(b) by 0 days.

(21) Appl. No.: 16/955,036

(22) PCT Filed: Feb. 28, 2019

(86) PCT No.: PCT/CN2019/076490
§ 371 (c)(1),
(2) Date: Jun. 17, 2020

(87) PCT Pub. No.: WO2019/196566
PCT Pub. Date: Oct. 17, 2019

(65) Prior Publication Data
US 2021/0118225 A1    Apr. 22, 2021

(30) Foreign Application Priority Data
Apr. 12, 2018 (CN) .......................... 201810325677.0

(51) Int. Cl.
*G06T 17/20* (2006.01)
*A63F 13/23* (2014.01)
*G06T 15/10* (2011.01)

(52) U.S. Cl.
CPC .............. *G06T 17/20* (2013.01); *A63F 13/23* (2014.09); *G06T 15/10* (2013.01)

(58) Field of Classification Search
None
See application file for complete search history.

(56) References Cited

U.S. PATENT DOCUMENTS

| | | | |
|---|---|---|---|
| 10,008,031 B1 * | 6/2018 | Pigeon | G06F 30/15 |
| 10,740,891 B1 * | 8/2020 | Chen | G06T 7/001 |
| 2003/0085818 A1 * | 5/2003 | Renton | G06Q 30/00 340/945 |

(Continued)

FOREIGN PATENT DOCUMENTS

| | | |
|---|---|---|
| CN | 102523473 A | 6/2012 |
| CN | 102722861 A | 10/2012 |

(Continued)

*Primary Examiner* — Sultana M Zalalee
(74) *Attorney, Agent, or Firm* — Gang Yu

(57) ABSTRACT

A method and apparatus for rendering a game image are disclosed. The method includes: acquiring a control meeting a preset transparency; generating a mesh model according to the control; synchronously loading the mesh model corresponding to the control in the process of displaying the control on a game image; and respectively rendering pixels of an area which is not covered by the mesh model and pixels corresponding to the control on the game image. The present disclosure solves the problem that pixel culling and rendering cannot be performed on a game image covered by a UI control under the architecture of game engine in the related art.

19 Claims, 2 Drawing Sheets

(56) References Cited

U.S. PATENT DOCUMENTS

| | | | | |
|---|---|---|---|---|
| 2007/0046687 A1* | 3/2007 | Soroushi | | G09G 5/026 |
| | | | | 345/589 |
| 2010/0189317 A1* | 7/2010 | Lehmann | | G06T 19/00 |
| | | | | 382/128 |
| 2010/0265254 A1 | 10/2010 | Liland et al. | | |
| 2012/0206452 A1* | 8/2012 | Geisner | | H04S 7/304 |
| | | | | 345/419 |
| 2012/0299920 A1* | 11/2012 | Coombe | | G06T 17/00 |
| | | | | 345/423 |
| 2013/0069943 A1 | 3/2013 | Kallio | | |
| 2013/0208014 A1* | 8/2013 | Fleck | | G06K 9/00684 |
| | | | | 345/672 |
| 2013/0271625 A1* | 10/2013 | Gruber | | G06K 9/4661 |
| | | | | 348/239 |
| 2014/0104267 A1* | 4/2014 | Amsinck | | G06T 15/405 |
| | | | | 345/419 |
| 2015/0054844 A1* | 2/2015 | Frattarola | | G06T 9/00 |
| | | | | 345/582 |
| 2016/0026253 A1* | 1/2016 | Bradski | | H04N 13/344 |
| | | | | 345/8 |
| 2017/0024112 A1* | 1/2017 | McKegney | | G06F 3/04815 |
| 2017/0243324 A1* | 8/2017 | Mierle | | G06T 11/60 |
| 2017/0278304 A1* | 9/2017 | Hildreth | | G02B 27/0172 |
| 2017/0372509 A1* | 12/2017 | Paltashev | | G06T 15/005 |
| 2018/0032522 A1* | 2/2018 | Singhal | | G06F 16/24578 |
| 2018/0130259 A1* | 5/2018 | Leefsma | | G06Q 10/101 |
| 2018/0308277 A1* | 10/2018 | Surti | | G06T 15/005 |
| 2020/0211230 A1* | 7/2020 | Zhao | | G06T 15/04 |
| 2020/0368616 A1* | 11/2020 | Delamont | | A63F 13/25 |

FOREIGN PATENT DOCUMENTS

| | | | |
|---|---|---|---|
| CN | 104183005 A | | 12/2014 |
| CN | 105354872 A | | 2/2016 |
| CN | 105468353 A | | 4/2016 |
| CN | 106056663 A | | 10/2016 |
| CN | 106097299 A | | 11/2016 |
| CN | 106355644 A | | 1/2017 |
| CN | 106709863 A | | 5/2017 |
| CN | 107025681 A | | 8/2017 |
| CN | 107689189 A | | 2/2018 |
| CN | 107832103 A | | 3/2018 |
| CN | 108479067 A | | 9/2018 |
| WO | 2014009602 A | | 1/2014 |
| WO | WO-2019112546 A1 * | 6/2019 | G06T 19/00 |

* cited by examiner

METHOD AND APPARATUS FOR RENDERING GAME IMAGE

CROSS-REFERENCE TO RELATED APPLICATIONS

The present disclosure claims the priority of a Chinese patent application filed to the China Patent Office on Apr. 12, 2018, application No. 201810325677.0, and the invention name "method and apparatus for rendering a game image", the entire contents of which are incorporated herein by reference.

TECHNICAL FIELD

The present disclosure relates to the technical field of game interface rendering, and in particular, to a method and apparatus for rendering game image.

BACKGROUND

Currently, a User Interface (UI) component and a 3D drawing image are usually combined to display a game. In the related technologies, the mainstream practice of rendering the game image is that an individual UI component is cooperate with a 3D renderer in a game engine. In such manner, rendering of the UI and the 3D image are separated. With the expansion of game requirements, rendering cost in both of the UI and the 3D image are very considerable. In addition, at present, a semi-full-screen interface, or a pop-up window is often used for displaying the game image. On the basis of the original rendered 3D image, more semi-transparent drawing layers are covered, with more UIs are provided, the rendering pressure of the Graphics Processor Unit (GPU) is higher.

In a mobile GPU, in order to solve the performance waste caused by repeatedly rendering the same pixel, chip manufacturers generally design a function of pixel culling in fabricated chips. The early pixel culling function was mainly implemented by sequential-dependent z-rendering in combination with a pre-optimized rendering technology. After a batch of new architecture GPUs appeared, such as Power VR and so on, Tile Based Deferred Rendering (TBDR) technology appears, deferred rendering technology at hardware level is added to achieve pixel-level in a process of occlusion culling, and greatly improving the drawing performance in 3D scenes with higher overdraw. Since a UI control shades a 3D drawing image in the combined display of a UI component and a 3D image, if a non-transparent or partially semi-transparent UI can be used to cull covered pixels through the TBDR, the rendering cost can be greatly reduced. However, due to the limitation of GPU architecture, only when a Z buffer is commonly used and a non-semi-transparent model mesh is drawn, the GPU can perform hidden surface culling optimization. In addition, an ordinary UI drawing process is drawing independently of the 3D world. An invoking drawing instruction of a 3D renderer cannot transmit non-transparent pixel information in the control to hardware. The hardware structure cannot support the function of culling a shading part of a 3D drawn pixel in a UI covered part.

In view of the problem that pixel culling and rendering cannot be performed on a game image covered by a UI control under the architecture of a game engine in the related art, an effective solution is not provide at present.

SUMMARY

The disclosure mainly aims to provide a method and an apparatus for rendering a game image, which are used for solving the problem that pixel culling and rendering cannot be performed on a game image covered by a UI control under the architecture of a game engine in the related art.

In order to achieve the above objective, according to one aspect of the present disclosure, a method for rendering a game image is provided. The method may include the following steps: a control meeting a preset transparency is acquired; a mesh model is generated according to the control; the mesh model corresponding to the control is synchronously loaded in the process of displaying the control on a game image; and pixels of an area which is not covered by the mesh model and pixels corresponding to the control on the game image are respectively rendered.

Further, the step of generating the mesh model according to the control may include: an image referenced by the control is acquired; non-transparent pixels of the image referenced by the control are rasterized to obtain a polygon; and the polygon is triangulated to generate the mesh model.

Further, before the polygon is triangulated to generate the mesh model, the method may further include: two adjacent edges in an outline of the polygon are selected for combination until a yield ratio satisfies a preset value, the yield ratio being determined by the number of pixels covered by the polygon and the number of edges of the polygon in the combination process.

Further, after the mesh model is generated according to the control, the method may further include: all of the mesh models are serialized to generate a serialization file; and the control corresponding to each mesh model in the serialization file is respectively determined, and each mesh model is stored in a storage path of the corresponding control.

Further, before the mesh model corresponding to the control is synchronously loaded in the process of displaying the control on a game image, the method may further include: a transformation matrix corresponding to the control is acquired; and the transformation matrix is applied to the mesh model corresponding to the control.

Further, the step of respectively rendering pixels of an area which is not covered by the mesh model and pixels corresponding to the control on the game image may include: the pixels covered by the mesh model are culled from the game image, and the pixels not covered by the mesh model are rendered; and the pixels corresponding to the control are synchronously or asynchronously rendered in the process of rendering the pixels not covered by the mesh model.

Further, the step of synchronously loading the mesh model corresponding to the control in a process of displaying the control on a game image may include: in the process of displaying the control on the game image, a pop-up box for prompting in game progress is presented, and the mesh model corresponding to the pop-up box is loaded. When the pop-up box for prompting in game progress disappears, the corresponding mesh model of the pop-up box is disappeared accordingly. When the pop-up box moves and transforms, the corresponding mesh model of the pop-up box performs moving and transforming accordingly.

Further, the step of storing each mesh model in a storage path of the corresponding control may include: each mesh model is stored offline in a UI project.

Further, the organization structure of the space of the UI project is a tree structure, each control has a unique path relative to a root node of the tree structure.

Further, the step of storing each mesh model in a storage path of the corresponding control may include: the name and storage path of the control is acquired, the mesh model in the storage path of the corresponding control is stored according to the name of the corresponding control of the mesh model.

Further, the step of the rendering of the game image include: an upper UI and a lower game scene, pixels of an area which is not covered by the mesh model and pixels corresponding to the control on the game image are respectively rendered may include: the pixels of the UI control positioned on the upper layer and the pixels of the game scene not covered by the mesh model on the lower layer are respectively rendered.

Further, the step of the pixels covered by the mesh model are culled from the game image, and the pixels not covered by the mesh model are rendered may include: the non-transparent mesh model is put into the game scene, and renders pixels in the game scene that are not covered by the mesh model to achieve culling and rendering of the game scene.

Further, the step of selecting two adjacent edges in an outline of the polygon for combination until a yield ratio satisfies a preset value may include:

if the yield ratio of the current polygon is greater than a preset value, the combination be stopped;

if the ratio is smaller than the preset yield ratio, combining the two adjacent edges of the polygon continuously, at the same time, it is ensured that after the current two adjacent edges are combined, the number of decreasing pixels that can be covered by the polygon is minimum, and iterative combination is performed until the yield ratio of the current polygon is greater than the preset value.

Further, the transformation matrix is a position rotation and scaling matrix.

Further, synchronously loading the mesh model corresponding to the control in the process of displaying the control on the game image comprises:

synchronously loading the mesh model corresponding to the control based on the transformation matrix.

In order to achieve the above objective, according to another aspect of the present disclosure, an apparatus for rendering a game image is provided. The apparatus may include: a first acquisition element, configured to acquire a control meeting a preset transparency; a generation element, configured to generate a mesh model according to the control; a loading element, configured to synchronously load the mesh model corresponding to the control in the process of displaying the control on a game image; and a rendering element, configured to respectively render pixels which are not covered by the mesh model and pixels corresponding to the control in the game image.

Further, the generation element may include: an acquisition module, configured to acquire an image referenced by the control; a rasterizing module, configured to rasterize non-transparent pixels of the image referenced by the control to obtain a polygon; and a model construction module, configured to triangulate the polygon to generate the mesh model.

In order to achieve the above objective, according to another aspect of the present disclosure, a non-transitory storage medium is provided, which may include a stored program, wherein the program performs the method for rendering a game image according to any one of the above.

In order to achieve the above objective, according to another aspect of the present disclosure, a processor is provided, which may be configured to run a program, wherein the program is run to perform the method for rendering a game image according to any one of the above.

BRIEF DESCRIPTION OF THE DRAWINGS

The accompanying drawings, which constitute a part of the present disclosure, are used to provide a further understanding of the present disclosure, and the exemplary embodiments of the present disclosure and the description thereof are used to explain the present disclosure, but do not constitute improper limitations to the present disclosure. In the drawings.

DETAILED DESCRIPTION OF THE EMBODIMENTS

It is to be noted that in the case of no conflict, the features in the embodiments and the embodiments in the present disclosure may be combined with each other. The present disclosure will be described in detail below with reference to the accompanying drawings and in conjunction with the embodiments.

In order to make those skilled in the art better understand the solutions of the present disclosure, the technical solutions in the embodiments of the present disclosure will be clearly and completely described below with reference to the accompanying drawings in the embodiments of the present disclosure. It is apparent that the described embodiments are only a part of the embodiments of the present disclosure, not all the embodiments. Based on the embodiments of the present disclosure, all other embodiments obtained by those of ordinary skill in the art without creative efforts should fall within the scope of protection of the present disclosure.

It is to be noted that the terms "first, second", and the like in the specification and claims of the present disclosure and in the above accompanying drawings are used to distinguish similar objects, and not necessarily to describe a specific sequence or a precedence order. It will be appreciated that data used in such a way may be exchanged under appropriate conditions, in order that the embodiments of the present disclosure described here can be implemented. In addition, the terms "include" and "have", as well as any variations thereof, are intended to cover a non-exclusive inclusion. For example, it is not limited for processes, methods, systems, products or apparatus containing a series of steps or units to clearly list those steps or units, and other steps or units which are not clearly listed or are inherent to these processes, methods, products or devices may be included instead.

For ease of description, some of the nouns or terms involved in the embodiments of the present disclosure are described below:

UI: Abbreviation for User Interface, which generally refers to an operation interface of a user, including an APP running on a mobile device, a web page, a display interface of an application related to a smart wearable device, etc.

GPU: Abbreviation for Graphics Processing Unit, which refers to a graphic processor, also known as a display core, a visual processor or a display chip, a microprocessor that specially performs image operation on a personal computer, a workstation, a game console and some mobile devices, such as a tablet or a smart phone.

According to an embodiment of the present disclosure, a method for rendering a game image is provided.

Figure 1:
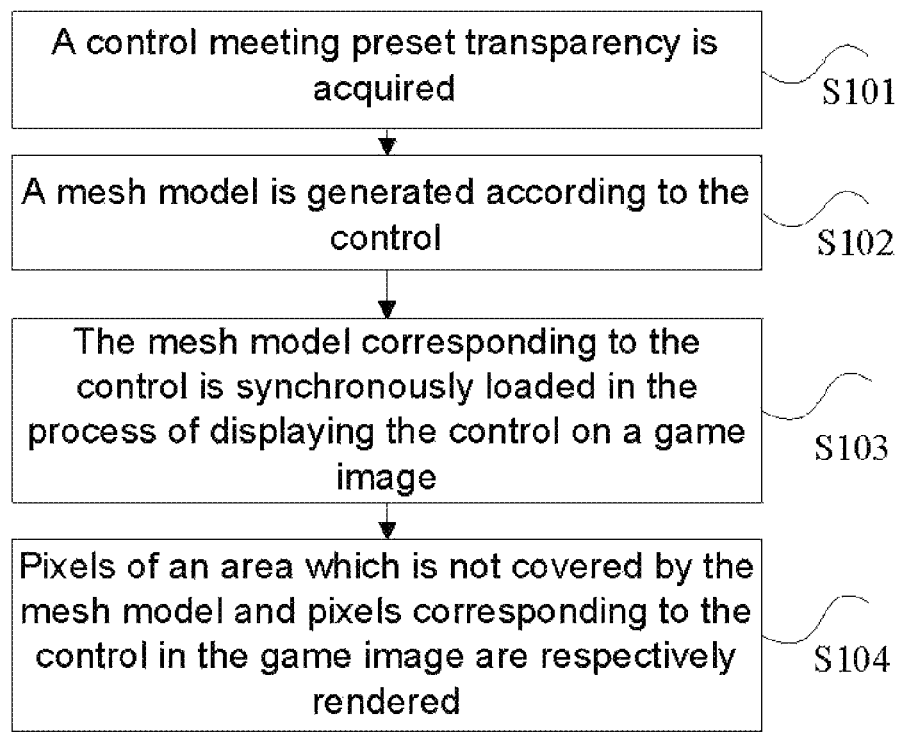
FIG. 1 is a flowchart of a method for rendering a game image according to an embodiment of the present disclosure.

FIG. 1 is a flowchart of a method for rendering a game image according to an embodiment of the present disclosure. As shown in FIG. 1, the method includes the following steps:

At step S101, a control meeting a preset transparency is acquired.

It is to be noted that a game image is usually displayed by combining a UI and a game scene, and rendering on a screen by a GPU. The game image includes a scene layer and a UI layer, that is, a 3D game scene and one or more controls. The UI controls are located on an upper layer of the 3D game scene to present game information, while the UI controls will cover part of the 3D game scene.

For example, during the a game process, some controls are loaded on the upper layer of the 3D game scene, such as a button for starting and stopping the game, a pop-up box for prompting operation information, a mall interface for performing purchase operations within a game, and a window for playing video advertisement. The button, the pop-up box and other controls may be set as semi-transparent, partially non-transparent or non-transparent. The non-transparent part of the control will cover the 3D game scene. The window of video advertisement is usually set as non-transparent, so that the window will cover the lower layer of the 3D game scene. In order to identify pixels covered by the control in the 3D game scene and perform elimination rendering to reduce an unnecessary rendering cost on the 3D game scene, a UI project is first parsed to acquire a control that can cover the lower layer of the 3D game scene, i.e., a control that meets a preset transparency. For example, the control of which the non-transparent part occupies over 5% of the whole control is filtered out to obtain a target control.

At step S102, a mesh model is generated according to the control.

It is to be noted that GPU hardware can only identify covering information generated by the non-transparent mesh model, and a UI renderer and a 3D renderer cannot call a drawing instruction to transmit non-transparent pixel information of the control to the GPU hardware. In order to perform rendering of a UI control with non-transparent pixels in the process of occlusion culling, the mesh model is generated according to the control.

In order to extract a part of pixels from the UI control for rendering in the process of occlusion culling, optionally, in the method for rendering a game image according to the embodiment of the present disclosure, the step of generating the mesh model according to the control includes: an image referenced by the control is acquired; non-transparent pixels of the image referenced by the control are rasterized to obtain a polygon; and the polygon is triangulated to generate the mesh model.

For example, an image referenced by the target control is acquired, for example, a circular non-transparent image referenced by a circular button is acquired. A square image referenced by pop-up box for prompting in game progress is acquired. The prompting image in the game progress may include elements such as a prompting character pattern and the like. A non-transparent square image referenced by an advertisement video window is acquired. It is to be noted that since such advertisement video window usually completely covers the 3D game scene under the window, it is considered that the advertisement video window references a non-transparent image.

Figure 2:
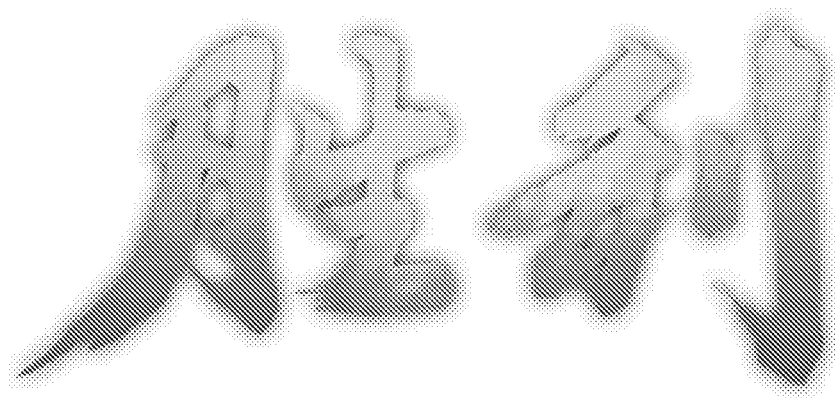
FIG. 2 is a schematic diagram of an image referenced by a control according to an embodiment of the present disclosure.
Figure 3:
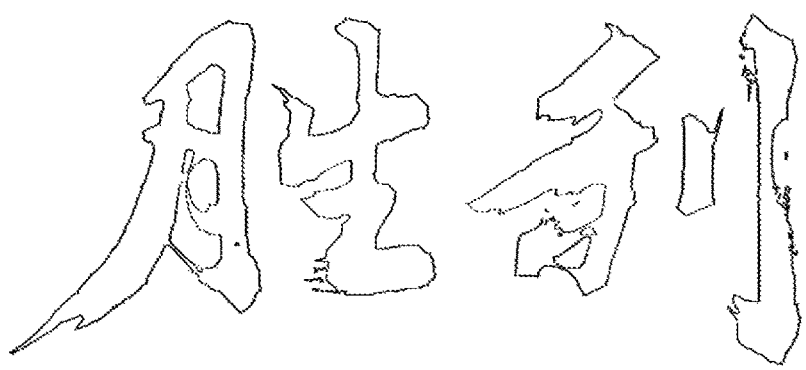
FIG. 3 is a schematic diagram of a polygon generated by an image referenced by a control according to an embodiment of the present disclosure.
Figure 4:
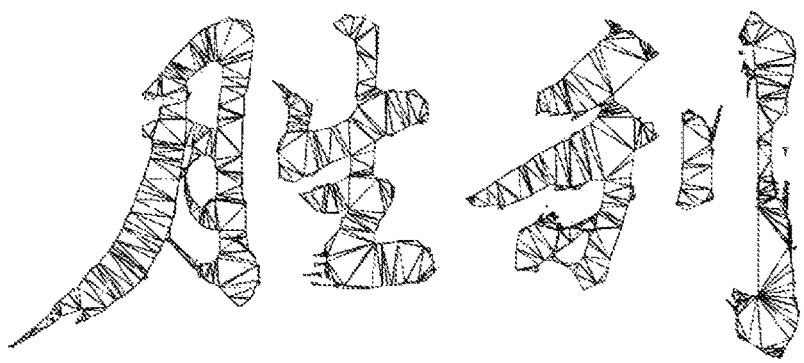
FIG. 4 is a schematic diagram of a mesh model generated by an image referenced by a control according to an embodiment of the present disclosure.

The present embodiment takes the pop-up box for prompting in game progress as a target control to introduce the generation of the mesh model. First, an image referenced by the target control is acquired. FIG. 2 is a schematic diagram of an image referenced by a control according to an embodiment of the present disclosure. As shown in FIG. 2, a word "victory (as Chinese characters 胜利)" in the image is composed of non-transparent pixels, and the other part is composed of transparent pixels. The non-transparent pixels of the image referenced by the pop-up box for prompting in game progress are rasterized. Since the word "victory (as Chinese characters 胜利)" is composed of non-transparent pixels, that is, the pixels of the word "victory (as Chinese characters 胜利)" are rasterized to obtain a polygon. FIG. 3 is a schematic diagram of a polygon generated by an image referenced by a control according to an embodiment of the present disclosure. FIG. 3 shows a contour of the word "victory (as Chinese characters 胜利)". The contour of the word "victory (as Chinese characters 胜利)" is triangulated to obtain a mesh model. FIG. 4 is a schematic diagram of a mesh model generated by an image referenced by a control according to an embodiment of the present disclosure. As shown in FIG. 4, a triangular mesh model is illustrated.

In order to reduce the additional cost brought by the mesh model, optionally, in the method for rendering a game image provided by the embodiment of the present disclosure, before the polygon is triangulated to generate the mesh model, the method further includes: two adjacent edges in an outline of the polygon are selected for combination until a yield ratio meets a preset value, the yield ratio being determined by the number of pixels covered by the polygon and the number of edges of the polygon in the combination process.

It is to be noted that the generated mesh model will bring additional cost in subsequent loading and rendering during the process of occlusion culling. In order to control the cost brought by the mesh model within a certain range, the additional cost of pixel occlusion culling technology is controlled to a negligible level relative to the system overhead, the polygon is iteratively simplified before the mesh model is generated.

For example, a preset value which needs to be met by the yield ratio is customized by a user or a developer in a self-defined way. When the polygon is simplified, two adjacent edges of the polygon are selected for combination, and mean while, it is necessary to ensure that after the current two adjacent edges are combined, the number of decreasing pixels that can be covered by the polygon, that is, the average number of pixels that can be covered by each mesh surface is minimum. Since the mesh surface itself has additional cost, the number of surfaces should be controlled as much as possible, so the yield ratio is a parameter used to make a mesh simplifying algorithm converge. It is to be noted that two adjacent edges have a common inflection point, and connecting two vertices that are not shared is to combine two adjacent edges. After one combination, the ratio of the number of pixels covered by the current polygon to the number of edges of the current polygon is calculated to obtain the yield ratio of the current polygon. If the yield ratio of the current polygon is greater than a preset value, the combination may be stopped. If the ratio is smaller than the preset yield ratio, the two adjacent edges of the polygon are combined continuously. At the same time, it should be ensured that after the two adjacent edges are combined, the number of decreasing pixels that can be covered by the polygon is minimum, and iterative combination is performed until the yield ratio of the current polygon is greater than the preset value.

At step S103, the mesh model corresponding to the control is synchronously loaded in the process of displaying the control on a game image.

For example, in the process of displaying the control on the game image, a pop-up box for prompting in game progress is presented, and the mesh model corresponding to the pop-up box is loaded. When the pop-up box for prompting in game progress disappears, the corresponding mesh model of the pop-up box is disappeared accordingly. When the pop-up box moves and transforms, the corresponding mesh model of the pop-up box performs moving and transforming accordingly.

It is to be noted that after the mesh model is generated according to the control, a UI frame is changed, so that the mesh model corresponding to the control is synchronously loaded in the process of displaying the control on the game image.

In order to establish the correspondence between the control and the corresponding mesh model, optionally, in the method for rendering a game image provided by the embodiment of the present disclosure, after the mesh model is generated according to the control, the method further includes: all of the mesh models are serialized to generate a serialization file; and the control corresponding to each mesh model in the serialization file is respectively determined, and each mesh model is stored in a storage path of the corresponding control.

For example, the mesh model corresponding to each control is serialized into a file and stored offline in a UI project. Since the organization structure of the UI project is a tree structure, each control has a unique path relative to a root node of the tree structure. The name and storage path of the control are acquired, and the mesh model is stored in the storage path of the corresponding control according to the name of the corresponding control of the mesh model, so that an engine can read it and obtain the correspondence between the mesh model and the control. After obtaining the correspondence between the mesh model and the control, a UI loader is modified to realize synchronous loading of the corresponding mesh when the UI control is loaded.

It is to be noted that the algorithm for acquiring the mesh model is complex, and is not suitable for obtaining and running in real time during loading of the UI, so the mesh model is preferred to store offline in advance and then loaded when needed.

In order to realize the corresponding transformation of the mesh model with the transformation of the corresponding control, optionally, in the method for rendering a game image provided by the embodiment of the present disclosure, before the mesh model corresponding to the control is synchronously loaded in the process of displaying the control on a game image, the method further includes: a transformation matrix corresponding to the control is acquired; and the transformation matrix is applied to the mesh model corresponding to the control. The step of synchronously loading the mesh model corresponding to the control in the process of displaying the control on the game image may include: the mesh model corresponding to the control is synchronously loaded based on the transformation matrix.

It is to be noted that in order to facilitate the engine to render the UI control, each control is matched with a transformation matrix of position rotation and scaling, and only need to apply the same matrix to the mesh model to achieve the purpose of synchronous transformation of the mesh model with the corresponding control.

For example, in the process of displaying the control on the game image, a prompting pop-up box in the game progress is presented, and the mesh model corresponding to the pop-up box is loaded at the same time. A player drags the pop-up box, and the corresponding mesh model of the pop-up box is moved with the movement of the pop-up box. When the player scales the pop-up box, the corresponding mesh model of the pop-up box is scaled with the scaling of the pop-up box. When the player rotates the pop-up box, the corresponding mesh model of the pop-up box is rotated with the rotation of the pop-up box.

At step S104, pixels of an area which is not covered by the mesh model and pixels corresponding to the control in the game image are respectively rendered.

For example, the rendering of the game image is divided into an upper UI and a lower game scene. Pixels of the UI control positioned on the upper layer and pixels of the game scene not covered by the mesh model on the lower layer are respectively rendered.

Optionally, in the method for rendering a game image provided by the embodiment of the present disclosure, the step of respectively rendering pixels not covered by the mesh model and pixels corresponding to the control in the game image includes: the pixels covered by the mesh model are culled from the game image, and the pixels not covered by the mesh model are rendered; and the pixels corresponding to the control are synchronously or asynchronously rendered in the process of rendering the pixels not covered by the mesh model.

It is to be noted that the culling and rendering are determined by the drawing of a GPU hardware. Before culling and rendering, the 3D renderer puts the non-transparent mesh model into the 3D game scene, and the 3D renderer renders pixels in the 3D game scene that are not covered by the mesh model to achieve culling and rendering of the 3D game scene. Independently, the UI renderer is used to render the upper UI control. Therefore, without affecting the user experience, the unnecessary cost brought by rendering the 3D scene covered by the UI control is greatly reduced.

The method for rendering a game image according to the embodiment of the present disclosure includes: a control meeting a preset transparency is acquired; a mesh model is generated according to the control; the mesh model corresponding to the control is synchronously loaded in the process of displaying the control on a game image; and pixels not covered by the mesh model and pixels corresponding to the control in the game image are respectively rendered. The problem that pixel culling and rendering cannot be performed on a game image covered by a UI control under the architecture of game engine in the related art is solved. By generating the corresponding mesh model according to the UI control, the effect of pixel culling and rendering on the game image covered by the UI control under the architecture of game engine is achieved.

It is to be noted that the steps shown in the flowchart of the accompanying drawings may be executed in a computer system, such as a set of computer-executable instructions. And that, although a logic sequence is shown in the flowchart, yet in some cases, the illustrated or described steps may be executed in a sequence different from that herein.

The embodiment of the present disclosure further provides an apparatus for rendering a game image. It is to be noted that the apparatus for rendering a game image according to the embodiment of the present disclosure may be configured to perform the method for rendering a game image provided by the embodiment of the present disclosure. The apparatus for rendering a game image provided by the embodiment of the present disclosure is introduced below.

Figure 5:
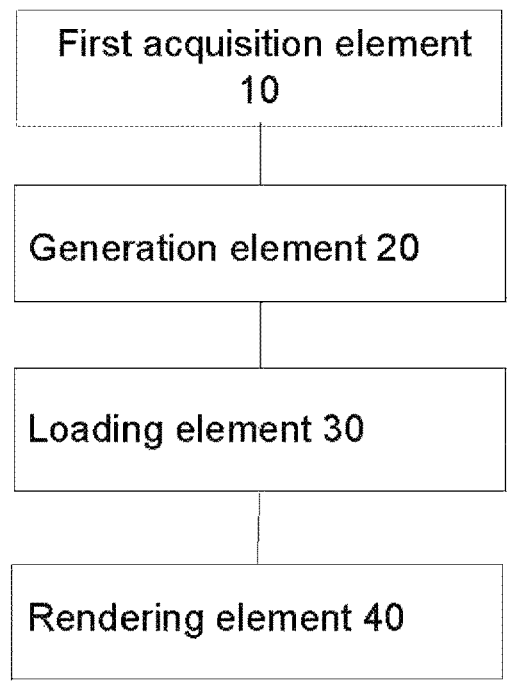
FIG. 5 is a schematic diagram of an apparatus for rendering a game image according to an embodiment of the present disclosure.

FIG. 5 is a schematic diagram of an apparatus for rendering a game image according to an embodiment of the present disclosure. As shown in FIG. 5, the apparatus includes: a first acquisition element 10, a generation element 20, a loading element 30, and a rendering element 40.

Specifically, the first acquisition element 10 is configured to acquire a control meeting a preset transparency.

The generation element 20 is configured to generate a mesh model according to the control.

The loading element 30 is configured to synchronously load the mesh model corresponding to the control in the process of displaying the control on a game image.

The rendering element 40 is configured to respectively render pixels of an area which is not covered by the mesh model and pixels corresponding to the control on the game image.

In the apparatus for rendering a game image provided by the embodiment of the present disclosure, the first acquisition element 10 acquires a control meeting a preset transparency; the generation element 20 generates a mesh model according to the control; the loading element 30 synchronously loads the mesh model corresponding to the control in the process of displaying the control on a game image; and the rendering element 40 respectively renders pixels not covered by the mesh model and pixels corresponding to the control in the game image. The problem that pixel culling and rendering cannot be performed on a game image covered by a UI control under the architecture of game engine in the related art is solved. The generation element 20 generates the mesh model according to the control. The rendering element 40 performs rendering based on the loaded mesh model. The effect of pixel culling and rendering on a game image covered by a UI control under the architecture of game engine is achieved.

Optionally, in the apparatus for rendering a game image provided by the embodiment of the present disclosure, the generation element 20 includes: an acquisition module, configured to acquire an image referenced by the control; a rasterizing module, configured to rasterize non-transparent pixels of the image referenced by the control to obtain a polygon; and a model construction module, configured to triangulate the polygon to generate the mesh model.

Optionally, in the apparatus for rendering a game image provided by the embodiment of the present disclosure, the generation element 20 further includes: a combination module, configured to select two adjacent edges in an outline of the polygon for combination until a yield ratio meets a preset value, the yield ratio being determined by the number of pixels covered by the polygon and the number of edges of the polygon in the combination process.

Optionally, the apparatus for rendering a game image provided by the embodiment of the present disclosure further includes: a serialization element, configured to serialize all of the mesh models to generate a serialization file; and a determination element, configured to respectively determine the control corresponding to each mesh model in the serialization file, and store each mesh model in a storage path of the corresponding control.

Optionally, the apparatus for rendering a game image provided by the embodiment of the present disclosure further includes: a second acquisition element, configured to acquire a transformation matrix corresponding to the control; and an application element, configured to apply the transformation matrix to the mesh model corresponding to the control. The loading element is further configured to synchronously load the mesh model corresponding to the control based on the transformation matrix.

Optionally, in the apparatus for rendering a game image provided by the embodiment of the present disclosure, the rendering element 40 includes: a first rendering module, configured to cull the pixels covered by the mesh model from the game image, and render the pixels not covered by the mesh model; and a second rendering module, configured to synchronously or asynchronously render the pixels corresponding to the control in the process of rendering the pixels not covered by the mesh model.

The memory may include a non-persistent memory, a Random Access Memory (RAM), and/or a non-volatile memory in a computer-readable medium, such as a Read Only Memory (ROM) or a flash RAM. The memory includes at least one memory chip.

The embodiment of the present disclosure provides a non-transitory storage medium on which a program is stored. The program is executed by a processor to implement the method for rendering a game image.

The embodiment of the present disclosure provides a processor. The processor is configured to run a program, wherein the program performs the method for rendering a game image when running.

Those skilled in the art should understand that the embodiments of the present disclosure may be provided as a method, a system or a computer program product. Thus, the present disclosure may take the form of an entirely hardware embodiment, an entirely software embodiment or an embodiments combining software and hardware aspects. Moreover, the disclosure may take the form of one or more computer program products implemented on a computer-usable, where the computer-usable storage medium contains computer-usable program code, and the computer-usable storage medium includes, but is not limited to, disk storage, CD-ROM, optical memory, etc.

The above are only embodiments of the present disclosure, and are not intended to limit the present disclosure. For those skilled in the art, the present disclosure may have various modifications and changes. Any modifications, equivalent replacements, improvements and the like made within the spirit and principle of the present disclosure should be included within the scope of claims of the present disclosure.

What is claimed is:

1. A method performed by a computer system for rendering a game image, comprising:
   acquiring a control meeting a preset transparency;
   generating a mesh model according to the control, wherein the mesh model is used for determining non-transparent pixels of an image referenced by the control, such that an area of the game image that is covered by the non-transparent pixels is to be culled in Graphic Processing Unit hardware;
   synchronously loading the mesh model corresponding to the control in a process of displaying the control on the game image; and
   respectively rendering pixels corresponding to an area of the game image that is NOT covered by the mesh model and pixels corresponding to the control on the game image.

2. The method as claimed in claim 1, wherein generating the mesh model according to the control comprises:
   acquiring an image referenced by the control;

rasterizing non-transparent pixels of the image referenced by the control to obtain a polygon; and triangulating the polygon to generate the mesh model.

3. The method as claimed in claim 2, wherein before triangulating the polygon to generate the mesh model, the method further comprises:

selecting two adjacent edges in an outline of the polygon for combination until a yield ratio satisfies a preset value, the yield ratio being determined by the number of pixels covered by the polygon and the number of edges of the polygon in the combination process.

4. The method as claimed in claim 3, wherein selecting two adjacent edges in an outline of the polygon for combination until a yield ratio satisfies a preset value comprising:

if the yield ratio of the current polygon is greater than a preset value, stopping the combination;

if the ratio is smaller than the preset yield ratio, combining the two adjacent edges of the polygon continuously, at the same time, it is ensured that after the current two adjacent edges are combined, the number of decreasing pixels that can be covered by the polygon is minimum, and performing the iterative combination until the yield ratio of the current polygon is greater than the preset value.

5. The method as claimed in claim 1, wherein after generating the mesh model according to the control, the method further comprises:

serializing all of the mesh models to generate a serialization file; and respectively determining the control corresponding to each mesh model in the serialization file, and storing each mesh model in a storage path of the corresponding control.

6. The method as claimed in claim 5, wherein storing each mesh model in a storage path of the corresponding control comprising: storing offline each mesh model in a User Interface project.

7. The method as claimed in claim 6, wherein the organization structure of the space of the User Interface project is a tree structure, each control has a unique path relative to a root node of the tree structure.

8. The method as claimed in claim 5, wherein storing each mesh model in a storage path of the corresponding control comprising:

acquiring the name and storage path of the control, storing the mesh model in the storage path of the corresponding control according to the name of the corresponding control of the mesh model.

9. The method as claimed in claim 1, wherein before synchronously loading the mesh model corresponding to the control in the process of displaying the control on the game image, the method further comprises:

acquiring a transformation matrix corresponding to the control; and applying the transformation matrix to the mesh model corresponding to the control.

10. The method as claimed in claim 9, wherein the transformation matrix is a position rotation and scaling matrix.

11. The method as claimed in claim 9, wherein synchronously loading the mesh model corresponding to the control in the process of displaying the control on the game image comprises:

synchronously loading the mesh model corresponding to the control based on the transformation matrix.

12. The method as claimed in claim 1, wherein respectively rendering pixels corresponding to an area of the game image that is NOT covered by the mesh model and pixels corresponding to the control on the game image comprises:

culling the pixels covered by the mesh model from the game image, and rendering the pixels not covered by the mesh model; and synchronously or asynchronously rendering the pixels corresponding to the control in the process of rendering the pixels not covered by the mesh model.

13. The method as claimed in claim 12, wherein culling the pixels covered by the mesh model from the game image, and rendering the pixels not covered by the mesh model comprising:

putting the non-transparent mesh model into the game scene, and rendering pixels in the game scene that are not covered by the mesh model to achieve culling and rendering of the game scene.

14. The method as claimed in claim 1, wherein the control is a pop-up box for prompting operation information, and wherein synchronously loading the mesh model corresponding to the control in a process of displaying the control on a game image comprising:

in the process of displaying the control on the game image, presenting the pop-up box for prompting in game progress, and loading a mesh model corresponding to the pop-up box, when the pop-up box for prompting in game progress disappears, making the corresponding mesh model of the pop-up box disappear accordingly; and when the pop-up box moves and/or transforms, moving and/or transforming the corresponding mesh model of the pop-up box accordingly.

15. The method as claimed in claim 1, wherein the rendering of the game image include: an upper User Interface and a lower game scene, respectively rendering pixels of an area which is not covered by the mesh model and pixels corresponding to the control on the game image comprising:

respectively rendering pixels of the User Interface control positioned on the upper layer and the pixels of the game scene not covered by the mesh model on the lower layer.

16. An apparatus for rendering a game image, comprising:

a first acquisition element, configured to acquire a control meeting a preset transparency;

a generating unit, configured to generate a mesh model according to the control, wherein the mesh model is used for determining non-transparent pixels of an image referenced by the control, such that an area of the game image that is covered by the non-transparent pixels is to be culled in Graphic Processing Unit hardware;

a loading unit, configured to synchronously load the mesh model corresponding to the control in the process of displaying the control on the game image; and a rendering unit, configured to respectively render pixels corresponding to an area of the game image that is NOT covered by the mesh model and pixels corresponding to the control on the game image.

17. The apparatus as claimed in claim 16, wherein the generating unit comprises:

an acquisition module, configured to acquire an image referenced by the control;

a rasterizing module, configured to rasterize non-transparent pixels of the image referenced by the control to obtain a polygon; and a model construction module, configured to triangulate the polygon to generate the mesh model.

18. A non-transitory storage medium, wherein the storage medium comprises a stored program, wherein the program executes the method for rendering a game image according to claim 1.

19. A processor, wherein the processor is configured to run a program, wherein the program executes the method for rendering a game image according to claim 1.

* * * * *